United States Patent
Iwasaki

(10) Patent No.: US 9,289,816 B2
(45) Date of Patent: Mar. 22, 2016

(54) PRODUCTION METHOD OF LEADING EDGE REINFORCEMENT OF FAN BLADE

(75) Inventor: Takayuki Iwasaki, Tokyo (JP)

(73) Assignee: IHI Corporation, Tokyo (JP)

( * ) Notice: Subject to any disclaimer, the term of this patent is extended or adjusted under 35 U.S.C. 154(b) by 1021 days.

(21) Appl. No.: 13/145,015

(22) PCT Filed: Jan. 22, 2010

(86) PCT No.: PCT/JP2010/050764
§ 371 (c)(1),
(2), (4) Date: Jul. 18, 2011

(87) PCT Pub. No.: WO2010/084942
PCT Pub. Date: Jul. 29, 2010

(65) Prior Publication Data
US 2011/0274555 A1    Nov. 10, 2011

(30) Foreign Application Priority Data
Jan. 22, 2009 (JP) ................. 2009-012150

(51) Int. Cl.
*B23K 20/00* (2006.01)
*B23K 20/02* (2006.01)
(Continued)

(52) U.S. Cl.
CPC .............. *B21D 53/78* (2013.01); *B21D 26/021* (2013.01); *B21D 26/055* (2013.01); *B23K 3/04* (2013.01); *B23K 20/02* (2013.01); *B23K 20/023* (2013.01); *B23P 15/04* (2013.01); *F01D 5/147* (2013.01); *F04D 29/023* (2013.01); *F04D 29/324* (2013.01); *F04D 29/388* (2013.01);
(Continued)

(58) Field of Classification Search
CPC ...... B23P 15/04; B21D 26/055; B21D 53/78; B21D 26/059; B23K 20/02; B23K 20/023; B23K 2201/18; B21K 3/04
USPC .................................. 228/193, 194
See application file for complete search history.

(56) References Cited

U.S. PATENT DOCUMENTS 3,519,416 A * 7/1970 Howard ................... 420/587
5,711,068 A * 1/1998 Salt .............................. 29/889.1
(Continued)

FOREIGN PATENT DOCUMENTS

EP          500458 A1 *  8/1992
JP          54 28264      3/1979
(Continued)

OTHER PUBLICATIONS

EP 500458 A1 computer english translation.*
(Continued)

*Primary Examiner* — Erin Saad
(74) *Attorney, Agent, or Firm* — Oblon, McClelland, Maier & Neustadt, L.L.P.

(57) ABSTRACT

A production method uses ultrasonic forming but does not leave a bonding face exposed to the exterior in a final product. The production method of a leading edge member of a fan blade comprises the steps of causing superplastic forming by using a combination of a first mold having a flow path for gas and a second mold having a female mold to pressurize a plate member with the gas through the flow path to fit the plate member onto the female mold; bonding a backing with the plate member processed with the superplastic forming; and cutting out a periphery of the plate member to obtain a product shape.

9 Claims, 7 Drawing Sheets

(51) Int. Cl.

| | | |
|---|---|---|
| *B21D 53/78* | (2006.01) | |
| *B23K 3/04* | (2006.01) | |
| *B21D 26/021* | (2011.01) | |
| *B21D 26/055* | (2011.01) | |
| *B23P 15/04* | (2006.01) | |
| *F01D 5/14* | (2006.01) | |
| *F04D 29/02* | (2006.01) | |
| *F04D 29/32* | (2006.01) | |
| *F04D 29/38* | (2006.01) | |

(52) U.S. Cl.
CPC ..... *F05D2240/303* (2013.01); *F05D 2300/702* (2013.01); *Y02T 50/673* (2013.01); *Y10T 29/49337* (2015.01)

(56) References Cited

U.S. PATENT DOCUMENTS

| | | | | |
|---|---|---|---|---|
| 5,729,901 | A | * | 3/1998 | Fowler et al. ............... 29/889.72 |
| 2006/0005594 | A1 | * | 1/2006 | Franchet et al. .................. 72/61 |
| 2006/0127265 | A1 | * | 6/2006 | Voice et al. ..................... 419/28 |

FOREIGN PATENT DOCUMENTS

| | | | |
|---|---|---|---|
| JP | 62-179822 | A | 8/1987 |
| JP | 4 157141 | | 5/1992 |
| JP | 4-258323 | A | 9/1992 |
| JP | 7-266063 | A | 10/1995 |
| JP | 8 134625 | | 5/1996 |
| JP | 10-511623 | A | 11/1998 |
| JP | 11 47859 | | 2/1999 |
| JP | 2000 135534 | | 5/2000 |
| JP | 2000-237828 | A | 9/2000 |
| JP | 2002-248579 | A | 9/2002 |
| JP | 2005 256838 | | 9/2005 |
| JP | 2006 26648 | | 2/2006 |
| JP | 2006-26685 | A | 2/2006 |
| JP | 2007 61829 | | 3/2007 |

OTHER PUBLICATIONS

U.S. Appl. No. 13/145,350, filed Jul. 20, 2011, Iwasaki.
Japanese Office Action issued May 7, 2013 in Patent Application No. 2010-547526 with English Translation.
International Search Report Issued Feb. 16, 2010 in PCT/JP10/050764 filed Jan. 22, 2010.

* cited by examiner (a)

(b)

(a)

(b)

(a)

(b)

(c)

(a)

(b)

(c)

PRODUCTION METHOD OF LEADING EDGE REINFORCEMENT OF FAN BLADE

TECHNICAL FIELD

The present invention relates to a method of production of members for reinforcing leading edges of fan blades applied to a fan of a jet engine.

BACKGROUND ART

A jet engine is for example comprised of a fan assembly, a high-pressure compressor, a combustor, a turbine and other assemblies, in the order from the foremost stage to the rear. Ambient air sucked by the fan assembly is compressed and introduced into the combustor by the high-pressure compressor, and is there mixed with fuel and then used for combustion. High-temperature gas flow at high pressure generated by the combustor is introduced into the turbine and there energy is extracted from the gas flow.

As directly sucking ambient air, the fan assembly is exposed to hard impact by foreign matters impinging thereon. In particular leading edges of fan blades require excellent impact resistance. One of solutions to requirement for such localized impact resistance may be, for example, to add reinforcements having high impact resistance limitedly to the leading edges of the fan blades.

On the other hand, fan blades require not-simple three-dimensional surfaces in order to realize good aerodynamic properties, and thus surfaces of the leading edge reinforcements are required to be in conformity therewith. However, most of materials having high impact resistance have poor workability and it is even hard to carry out cold working on these materials. How to execute such three-dimensional surface machining is a technical problem. Further, in such reinforcements, required thickness in view of impact resistance varies from its most leading portion to peripheral portions. In a point about how a sectional profile according to a required thickness distribution is given to its final shape, technical issues may exist.

More specifically, consistence of high impact resistance and three-dimensional surface machinability is for itself a challenging technical problem.

Japanese Patent Unexamined Publication 2005-256838 discloses a production method of leading edges of fan blades using superplastic forming. This art applies diffusion bonding instead of cold bending to formation of an envelope structure for being served to superplastic forming, thereby overcoming the problem in machining of complex shapes such as the leading edges of the fan blades.

DISCLOSURE OF INVENTION

The present inventors have made a keen study of a process of fracture which may occur during long term use. The inventors have consequently found out that cracking or fracturing frequently appears along particular faces and have further estimated that these faces may originate in diffusion bonding faces. Diffusion bonding is so sensitive to cleanness of faces before bonding and thus it is a common way to carry out inspection such as ultrasonic flaw detection on bonded portions after diffusion bonding for the purpose of assuring that no defect exists. However, the inventors have found out in the course of the study that, as maybe detection limits of such detection technics govern, or after long term use even if a product has no defect, still there is a concern about occurrence of fracture which originates in diffusion bonding faces.

Turning now, according to the art disclosed in aforementioned JP 2005-256838, diffusion bonding faces are disposed at the foremost edges which are most severely exposed to impact among portions of leading edge reinforcements, and also exposed to the exterior. It naturally gives rise to a concern about any problem in view of safety improvement.

The present invention has been achieved in view of the aforementioned problem and provides a method of production of members for reinforcing leading edges of fan blades without leaving bonding faces exposed to the exterior in final products although it employs superplastic forming.

According to a first aspect of the present invention, a production method of a leading edge member of a fan blade having a geometric shape comprises the steps of causing superplastic forming by using a combination of a first mold having a flow path for gas and a second mold having a female mold to pressurize a plate member with the gas through the flow path to fit the plate member onto the female mold; bonding a backing with the plate member processed with the superplastic forming; and cutting out a periphery of the plate member to obtain a product shape.

Preferably, the plate member consists essentially of a titanium superplastic material. More preferably, the step of causing the superplastic forming includes heating the plate member up to from 750 degrees C. to 950 degrees C. Alternatively preferably, the step of bonding includes diffusion bonding by using a combination of a third mold having a male mold and a fourth mold having a flow path for gas to pressurize the plate member with the gas through the flow path of the fourth mold. Further preferably, the male mold has a shape fitting with the geometric shape and in the step of bonding superplastic forming is carried out to fit the plate member processed with the superplastic forming onto the male mold. Further still preferably, the step of bonding is carried out by brazing. Alternatively still preferably, the production method further comprises the steps of bending the plate member into a U-letter shape; and sealing a periphery of the plate member to leave an opening. More preferably, the production method further comprises the step of giving a thickness distribution to the plate member.

According to a second aspect of the present invention, a leading edge member of a fan blade is provided, wherein the leading edge member is produced by any of the aforementioned methods.

According to a third aspect of the present invention, a fan blade applied to a fan of a jet engine is provided, wherein the fan blade comprises the leading edge member.

BEST MODE FOR CARRYING OUT THE INVENTION

Certain embodiments of the present invention will be described hereinafter with reference to the appended drawings.

Figure 4:
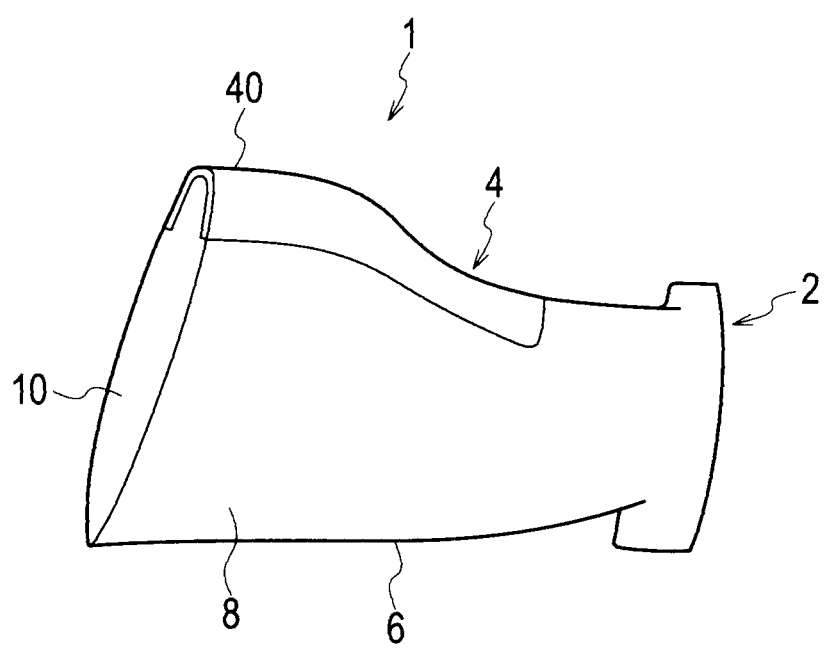
FIG. 4 is a perspective view of a fan blade along with the leading edge reinforcement.

Referring to FIG. 4, a fan blade 1 has a leading edge 4 and a trailing edge 6 extending from a root 2, and is comprised of a pressure side 8 and a suction side 10 smoothly linking between the leading edge 4 and the trailing edge 6. When the fan blade 1 rotates, air is fed from the leading edge 4 toward the trailing edge 6. The leading edge 4 is, to the greatest extent, subject to impact by foreign particles in the air colliding thereon and thus a leading edge reinforcement 40 is added thereto in order to protect and reinforce this part.

Figure 1:
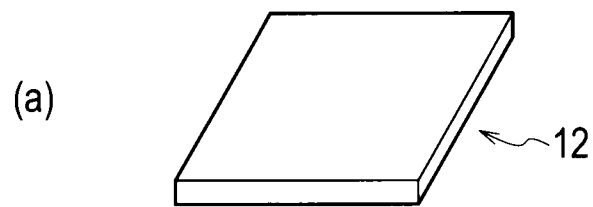
FIG. 1 is a drawing descriptive of each step in superplastic forming in the order of execution in a method of production according to a first embodiment of the present invention.
Figure 1:
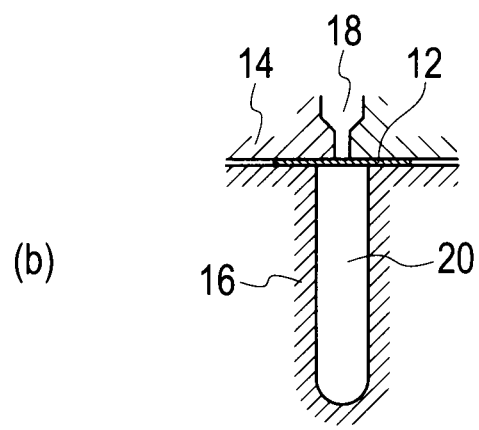
Figure 1:
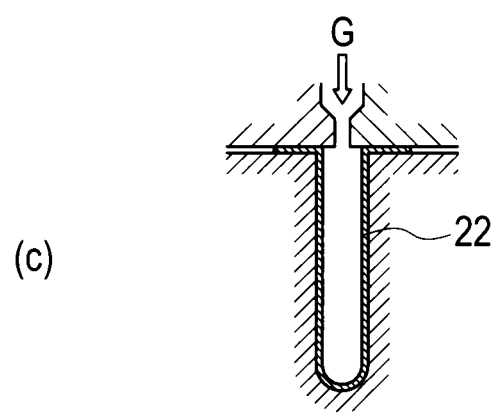

The following is a production method of the leading edge reinforcement 40 in accordance with the first embodiment. Referring to FIG. 1(a), first prepared is a planar plate member 12 having an arbitrary outline such as a rectangular shape. To the planar member, a thickness distribution may be given in advance by means of machining so as to realize an objective sectional profile after forming as a post-process. An optimum thickness distribution can be determined through calculator simulations alone or in combination with experiments. Giving the thickness distribution may be alternatively postponed at any of subsequent steps. Any material can be applied to the plate material 12 as long as the material has impact resistance and is capable of developing superplasticity when properly heated. As such materials, titanium superplastic materials can be exemplified. Further, as the titanium super plastic materials, a Ti-6Al-4V alloy, a Ti-5Al-2.5Sn alloy, a Ti-8Al-1Mo-1V alloy, a Ti-8Mn alloy, a Ti-7Al-4Mo alloy, a Ti-4.5Al-3V-2Fe-2Mo alloy and such can be exemplified.

Referring to FIG. 1(b), the plate member 12 is held between an upper mold 14 having a flow path 18 for gas and a lower mold 16 having a female mold. The upper mold 14 and the lower mold 16 are respectively comprised of proper heaters capable of realizing elevated temperatures required for superplastic forming. The shape of the female mold is not limited to what is shown in the appended drawings, and any shape beneficial for superplastic forming as described later may be applicable thereto. By means of a heater, alone or in combination with heating by heated gas G, the plate member 12 is heated up to a proper temperature. The temperature is any falling within the range from 750 to 950 degrees C. in cases of titanium superplastic alloys, however, it may be properly determined according to a material of the plate member 12. In a case where the material is the Ti-6Al-4V alloy, as taking a temperature range where superplasticity realizes into consideration, temperatures about 900 degrees C. may be properly selected. Further, in cases of the Ti-4.5Al-3V-2Fe-2Mo alloy or such, lower temperatures such as from 750 to 800 degrees C. may be preferable. With keeping the plate member 12 at such a proper temperature, the gas G is introduced through the opening of the plate member 12 so as to pressurize its interior, thereby carrying out superplastic forming. The plate member 12 superplastically deforms so as to recede into a cavity 20 defined by the female mold, thereby forming a plate member 22 fitting with the female mold as shown in FIG. 1(c).

In parallel with the aforementioned step, a backing 24 is prepared. While the backing 24 is preferably made of the same material as that of the plate member 12, any material which can be bonded with the plate member 12 is applicable thereto. Proper machining and, if necessary, plastic forming in combination are applied to the material of a bar-like shape and then the material is formed into a shape fitting with a bottom portion of the plate member 22 as shown in FIG. 2(a).

Figure 2:
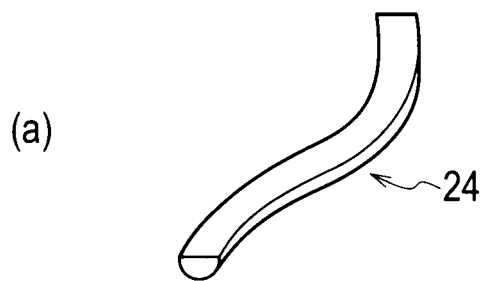
FIG. 2 shows a perspective view and a sectional view descriptive of a step of bonding a backplate in the method of production according to the embodiment.
Figure 2:
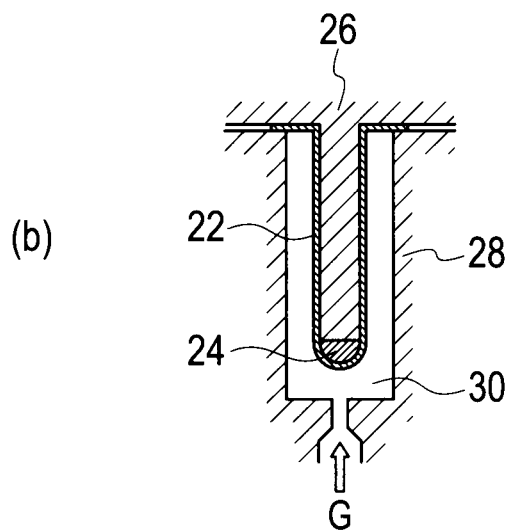

Referring to FIG. 2(b), the backing 24 is pressed against the bottom portion of the plate member 22 and further the upper mold 26 having a male mold is pressed against the backing 24. These members kept in this state are introduced into the lower mold 28 having the flow path 30 for gas. The plate member 22 is pressurized with gas G introduced through the flow path 30 of the lower mold 28 and proper heating is applied thereto, thereby carrying out diffusion bonding of the backing 24 and the plate member 22 mutually. Then superplastic forming may be simultaneously carried out so as to give a bend or a twist to the plate member 22.

The aforementioned bonding may be executed by brazing instead of diffusion bonding. In this case, a proper brazing material is in advance interposed between the backing 24 and the plate member 22, and thereafter heated.

Figure 3:
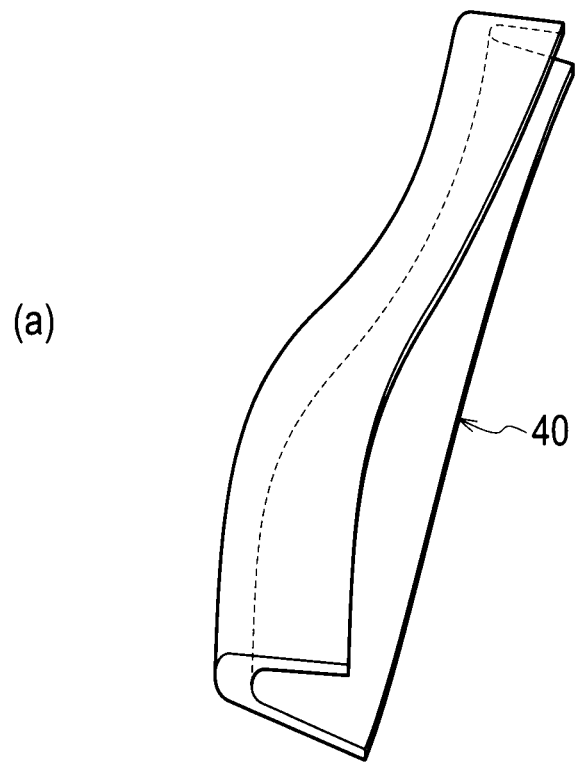
FIG. 3 shows a perspective view and a sectional view of a leading edge reinforcement.
Figure 3:
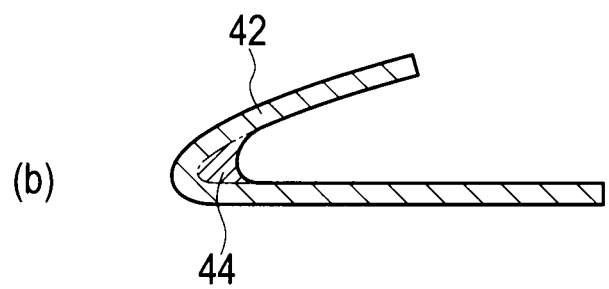

From the plate member 22 processed with the aforementioned steps, some portions are properly removed, and further finishing is executed thereon, thereby obtaining a leading edge reinforcement 40 having a geometric shape as shown in FIG. 3(a). The finishing may be carried out at this stage, or alternatively carried out after installing it in a fan blade. Referring to FIG. 3(b), a portion 44 originating in the backing 24 forms a unitary body with a portion 42 originating in the plate member 22, and thus a bonding face therebetween only exists at the back of the portion 42 and is not exposed to the exterior.

Figure 5:
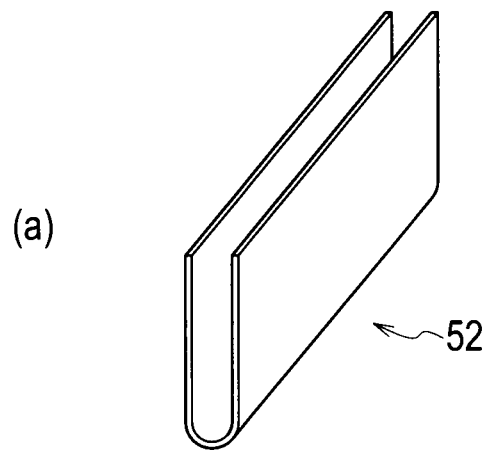
FIG. 5 is a drawing descriptive of each step in the order of execution in a method of production according to a second embodiment of the present invention.
Figure 5:
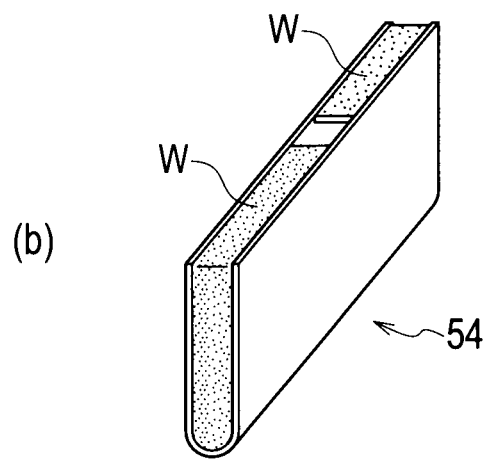
Figure 5:
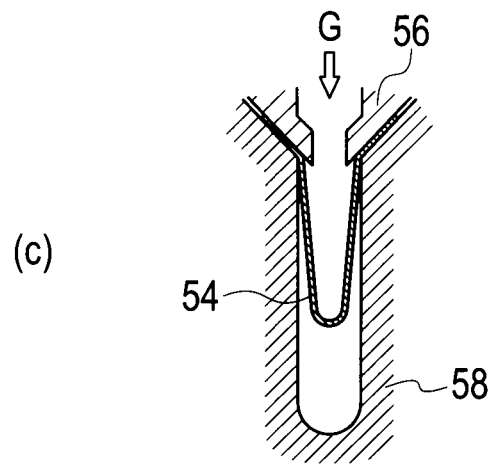

These steps described above may be modified in various ways. For example, prior to the step of superplastic forming, a plate member 52 is bent into a U-letter shape as shown in FIG. 5(a). Next its periphery is sealed with a sealing material W to leave an opening therein for introduction of gas for superplastic forming. Fixation of the sealing material W to the plate member 52 is executed by TIG welding for example. In a case where a material of the plate member is the Ti-6Al-4V alloy as exemplified above, YTAB640 is preferably applied to a welding material and argon gas is preferably used as shielding gas. Fixation or pressing by any jig may be used in combination with the TIG welding to narrow the gap in the periphery of the plate member 52. Further instead of the TIG welding, brazing or pressure bonding may be used for sealing. After these steps, a plate member 54 having an envelope structure with the opening is obtained. Next the plate member 54 is, as shown in FIG. 5(c), subject to superplastic forming by using the mold 56 having the flow path for gas G and the mold 58. Alternatively, press-contact of the mold 56 to the periphery of the plate member 54 can be used as a sealing instead of the sealing by welding. Labyrinths may be formed at places where the mold is made contact. By such a modification, a degree of deformation by the superplastic forming can be reduced as the deformation by bending is given in advance.

Figure 6:
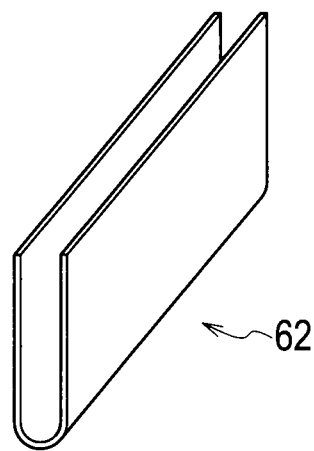
FIG. 6 is a drawing descriptive of each step for forming an envelope structure in the order of execution in a method of production according to a third embodiment of the present invention.
Figure 6:
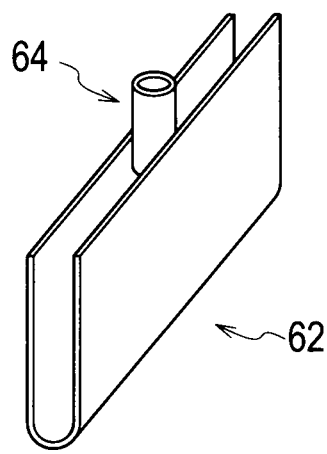
Figure 6:
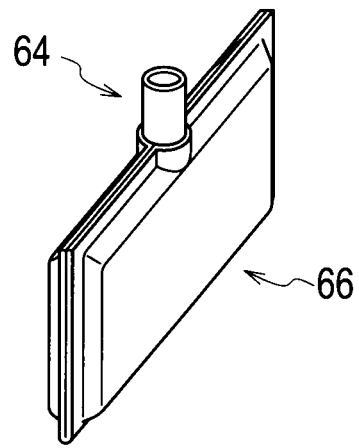
Figure 7:
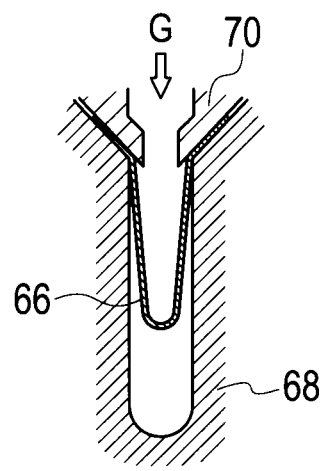
FIG. 7 is a sectional view descriptive of superplastic forming in a method of production according to the third embodiment of the present invention.
Figure 8:
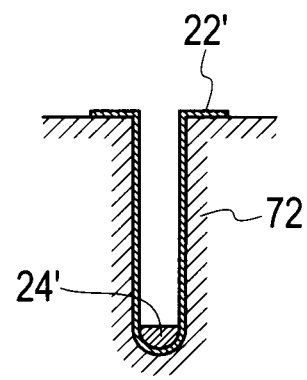
FIG. 8 is a sectional view descriptive of a step of bonding a backplate in a method of production according to a modification of the present invention.

Alternatively, a combination of fixation by any jig and pressing may be applied to a plate member 62 bent into a U-letter shape to form an envelope structure. The upper end of the plate member 62 bent into a U-letter shape is made to pinch a short tube 64 for conducting the gas G. Next a periphery of the plate member 62 except the portion where the short tube 64 is clamped to form a plate member 66 having an envelope structure as shown in FIG. 6(c). Alternatively without the short tube 64, clamping may be executed to leave an opening for conducting the gas G.

Faces being clamped are preferably made bonding together by means of brazing. Alternatively without brazing, press-contact by a mold may be used at the time of superplastic forming as a post-process.

The plate member 66 having an envelope structure obtained by the steps described above is subject to superplastic forming by using the mold 70 with the flow path for the gas G and the mold 68.

The aforementioned step may be modified in a way as described hereinafter. A plate member 22' is left within the lower mold 72 after superplastic forming. A backing 24' is prepared in parallel and then pressed against the bottom portion of the plate member 22' in the lower mold 72 with having a brazing material interposed therebetween. Next proper heating is applied thereto to braze the backing 24' with the plate member 22'. The steps of removing the plate member from the mold and thereafter inserting it into the mold again can be omitted. Thus this modification contributes to improvement of productivity. Of course, the plate member may be once detached and thereafter inserted into the identical or similar mold.

The foremost edge of the leading edge reinforcement 40 does not undergo a bonding step or a similar step and thus does not contain material discontinuity such as a bonding face. Although the backing 24 is bonded with the back of the foremost edge, the resultant bonding face is not exposed to the exterior. More specifically, as the final product does not contain a bonding face exposed to the exterior, the product does not give rise to concern about safety. Further as the foremost edge reflects thickness of the backing 24, the foremost edge is given a proper greater thickness than those of the other portions. The leading edge reinforcement 40 can have better impact resistance.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

Provided is a method of production of members for reinforcing leading edges of fan blades without leaving bonding faces exposed to the exterior in final products although it employs superplastic forming.

The invention claimed is:

1. A production method of a leading edge member of a fan blade having a geometric shape, the method comprising:
    causing superplastic forming by using a combination of a first mold having a flow path for gas and a second mold having a female mold to pressurize only a single unitary plate member with the gas through the flow path to fit the plate member onto the female mold;
    bonding a backing with the plate member processed with the superplastic forming; and
    cutting out a periphery of the plate member to obtain a product shape,
    wherein the bonding includes diffusion bonding by using a combination of a third mold having a male mold and a fourth mold having a flow path for gas to pressurize the plate member with the gas through the flow path of the fourth mold.

2. The production method of claim 1, wherein the plate member consists essentially of a titanium superplastic material.

3. The production method of claim 1, wherein the step of causing the superplastic forming includes heating the plate member up to from 750 degrees C. to 950 degrees C.

4. The production method of claim 1, wherein the male mold has a shape fitting with the geometric shape and in the step of bonding superplastic forming is carried out to fit the plate member processed with the superplastic forming onto the male mold.

5. The production method of claim 1, wherein the bonding is carried out by brazing.

6. The production method of claim 1, further comprising:
    bending the plate member into a U-letter shape; and
    sealing a periphery of the plate member except for an opening.

7. The production method of claim 1, further comprising: giving a thickness variation to the plate member.

8. The production method of claim 6, wherein the bending and the sealing are performed prior to the causing superplastic forming.

9. The production method of claim 8, wherein a tube is inserted into the U-letter shape plate member before the sealing.

\* \* \* \* \*